US008565937B2

(12) United States Patent
Blankenstein et al.

(10) Patent No.: US 8,565,937 B2
(45) Date of Patent: Oct. 22, 2013

(54) SYSTEM, PROCESS AND COMPUTER PROGRAM PRODUCT FOR ISSUE COMMUNICATION AND FACILITATING ISSUE RESOLUTION

(75) Inventors: Craig W. Blankenstein, Issaquah, WA (US); Michael N. Cowan, Sammamish, WA (US); Timothy S. Lloyd, Westminster, CA (US); Timothy I. May, Maple Valley, WA (US); William P. McCutchon, Covington, WA (US); Gary P. Noble, Lynnwood, WA (US); Bradley J. Taylor, Everett, WA (US); Janice L. Williams, Everett, WA (US)

(73) Assignee: The Boeing Company, Seattle, WA (US)

( * ) Notice: Subject to any disclaimer, the term of this patent is extended or adjusted under 35 U.S.C. 154(b) by 2950 days.

(21) Appl. No.: 10/116,312

(22) Filed: Apr. 4, 2002

(65) Prior Publication Data

US 2002/0116346 A1  Aug. 22, 2002

Related U.S. Application Data

(63) Continuation-in-part of application No. 09/656,678, filed on Sep. 7, 2000, now Pat. No. 7,302,397.

(51) Int. Cl.
*G01C 23/00* (2006.01)
*G06Q 30/00* (2012.01)
*G06F 17/00* (2006.01)

(52) U.S. Cl.
USPC ............................. 701/3; 705/26.41; 707/694

(58) Field of Classification Search
USPC .............. 345/1.3; 707/3, 694, 697; 705/8, 26, 705/26.44, 26.41, 302; 715/744, 533; 709/206, 223; 701/3
See application file for complete search history.

(56) References Cited

U.S. PATENT DOCUMENTS

| 5,495,412 A | 2/1996 | Thiessen |
| 5,504,890 A | 4/1996 | Sanford |
| 5,668,953 A | 9/1997 | Sloo |
| 5,671,360 A | 9/1997 | Hambrick et al. |
| 5,793,365 A | 8/1998 | Tang et al. |
| 5,878,214 A | 3/1999 | Gilliam et al. |
| 5,923,707 A | 7/1999 | Tanaka et al. |

(Continued)

OTHER PUBLICATIONS

Enigma; *Enigma wins order from Bombardier Aerospace to web-enable mission-critical maintenance information; Airframe manufacturer automates dissemination of technical content to support expanding regional aircraft division, decrease downtime*; Aug. 14, 2000; pp. 1-3; M2 Communications Ltd.

*Primary Examiner* — Muhammad Shafi
(74) *Attorney, Agent, or Firm* — Alston & Bird LLP

(57) ABSTRACT

A system for communicating issues and facilitating resolution of the issues, wherein the issues affect a plurality of similar complex systems, the system being implemented over a computer network and comprising at least one first computer device, a second computer device and a third computer device, all of which are configured to be in communication with the computer network. The first computer devices are adapted to be used by at least one customer, and the second computer device is adapted to be used by an originating entity. The third computer device is configured to maintain a discussion-capable electronic media accessible to the first and second computer devices over the computer network. The electronic media is configured to have a plurality of issues and a plurality of comments posted thereon to facilitate resolving the issue.

16 Claims, 12 Drawing Sheets

(56) References Cited

U.S. PATENT DOCUMENTS

| | | | |
|---|---|---|---|
| 5,953,707 A * | 9/1999 | Huang et al. ............... 705/7.25 |
| 5,956,491 A | 9/1999 | Marks |
| 5,960,173 A | 9/1999 | Tang et al. |
| 5,983,074 A | 11/1999 | Jansen |
| 5,995,951 A | 11/1999 | Ferguson |
| 5,999,908 A | 12/1999 | Abelow |
| 6,026,148 A | 2/2000 | Dworkin et al. |
| 6,117,932 A | 9/2000 | Hasegawa et al. |
| 6,177,932 B1 * | 1/2001 | Galdes et al. ............... 715/733 |
| 6,222,535 B1 | 4/2001 | Hurd, II |
| 6,304,861 B1 | 10/2001 | Ferguson |
| 6,571,234 B1 * | 5/2003 | Knight et al. ............... 1/1 |
| 6,606,744 B1 | 8/2003 | Mikurak |
| 6,609,100 B2 * | 8/2003 | Smith et al. ............... 705/7.26 |
| 6,707,469 B1 * | 3/2004 | Kelly ............... 715/744 |
| 2001/0018698 A1 * | 8/2001 | Uchino et al. ............... 707/533 |
| 2001/0018704 A1 | 8/2001 | Kikugawa |
| 2001/0025309 A1 * | 9/2001 | MacLeod et al. ............... 709/223 |
| 2002/0029167 A1 | 3/2002 | Muller |
| 2002/0184246 A1 | 12/2002 | Shkolnik |

* cited by examiner

SYSTEM, PROCESS AND COMPUTER PROGRAM PRODUCT FOR ISSUE COMMUNICATION AND FACILITATING ISSUE RESOLUTION

CROSS-REFERENCE TO RELATED APPLICATIONS

The present application is a continuation-in-part of U.S. patent application Ser. No. 09/656,678, entitled: System for Issue Notification, Prioritization, and Resolution and Associated Method filed on Sep. 7, 2000, now U.S. Pat. No. 7,302,397 the contents of which are incorporated herein by reference.

FIELD OF THE INVENTION

The present invention relates to management processes and, more particularly, to a system, process and computer program product for issue notification and collaboratively resolving issues.

BACKGROUND OF THE INVENTION

Many industries produce complex systems that have long service lives and thus must be continually monitored and engineered in order to meet, for example, evolving demands of the application as well as safety and maintenance concerns. Such systems may include, for example, aircraft, rail systems, medical systems, weapon systems, certain foods and drugs, and power generation plants where the continued support of the manufacturer and/or other originating entity is not only required for the upkeep of the systems, but possibly also to abide by state, federal, and/or international regulations administered by one or more corresponding agencies or to fulfill the terms of a military contract.

Such a situation is present with, for example, commercial aircraft sold by a manufacturer thereof to an airline which uses the aircraft as a part of its fleet. These aircraft such as, for example, the Models 707, 717, 727, 737, 747, 757, 767, 777 MD-11, MD-80, etc. produced by The Boeing Company incorporate extremely complex and expensive systems that face stringent scrutiny from the Federal Aviation Administration (FAA) in areas related to, for instance, safety and maintenance. However, these aircraft may sometimes experience problems, such as safety problems that have not yet been addressed and, thus, are not covered by a specific regulation or resolution. Such problems may include, for example, faulty fuel float switches on aircraft that may affect the airworthiness of such aircraft. These problems require remedies, nonetheless, and may require regulatory action by one or more respective agencies, particularly when the problem is recurrent or presents a significant safety hazard to operators or other persons.

Typically, for example, when safety problems occur in the aircraft that may affect the safe operation, or airworthiness, of the aircraft, a set of guidelines are administered to assess and to resolve the problem. One such set of guidelines is Air Transport Association (ATA) Specification 111. Under ATA Specification 111, when a concern regarding one or more components of a specific aircraft is identified or otherwise communicated by the manufacturer of the aircraft, the manufacturer notifies the original equipment manufacturer (OEM) of the respective component(s) as well as the FAA. Once the OEM and FAA have been notified, an initial safety assessment is conducted to determine whether the concern is a potential safety related-problem.

If the concern is assessed to be a potential safety-related problem, or if the FAA identifies the concern as a concern possibly targeted for regulatory action, a "Lead Airline" process is instituted to gather information from airline customers regarding the concern. In this regard, one airline is designated the Lead Airline, and is generally the airline with the most aircraft of the same series as the specific aircraft affected. Once the Lead Airline has been designated, the Lead Airline, in conjunction with the OEM and the ATA (the trade organization for the principal U.S. airlines), collaborate to review the concern to confirm the status of the concern as a safety-related problem.

During review of the concern, the Lead Airline is generally charged with gathering information from other airlines having aircraft of the same series as the specific aircraft affected to aid in the review. For example, the Lead Airline generally gathers information such as how many aircraft of the relevant series each airline operates, how many of the aircraft of the relevant series include the affected component(s), and whether the airline has encountered the concern on any of the relevant series of aircraft in the airline's fleet.

To gather the information, the Lead Airline typically communicates with the other airlines having aircraft of the same series as the specific aircraft affected via telephone, e-mail and/or facsimile. Whereas such communication methods are adequate, the Lead Airline generally has no incentive to actually contact all required parties and follow up as necessary. In this regard, as stated, the Lead Airline is typically the airline with the most aircraft of the same series as the aircraft affected. And as the Lead Airline is statistically in the best position to comment on the concern, the Lead Airline may not even feel compelled to attempt to communicate and/or follow up with the other airlines to gather additional information. Also, communicating with the other airlines via telephone, e-mail and/or facsimile is generally inefficient, cumbersome and does not allow for the timely communication of information that is often required in circumstances involving safety issues. Moreover, due to the inefficiency of conventional communication methods, the Lead Airline typically only has the opportunity to solicit information from airlines having aircraft of the same series as the specific aircraft affected, which can omit other airlines that could also have valuable additional information to contribute.

SUMMARY OF THE INVENTION

In light of the foregoing background, the present invention provides a system, process and computer program product for communicating issues and facilitating resolution of the issues administered by an originating entity, wherein the issues affect a plurality of similar complex systems, such as aircraft. For example, in contrast to conventional systems and methods, the system, process and computer program product of the present invention incorporate communication and decision-making among the manufacturer, customer airlines and the ATA to communicate and make decisions on a dynamic real-time basis. In one advantageous embodiment, the process is implemented over a computer network through a central site in communication therewith. First, an issue, such as a safety issue, is received at the central site from at least one first computer device adapted to be used by a customer in possession of a system in the series and/or a second computer device adapted to be used by the originating entity, such as an aircraft manufacturer. In such instances, the issue comprises a problem or other concern with the complex system requiring resolution. In addition, comments corresponding to the issue are then received at the central site from the customers, the originating entity and/or a resolution facilitating entity in response to the issue. The issue and/or the comments are posted on a discussion-capable electronic media configured to have a plurality of issues and a plurality of comments posted thereon and accessible to the first and second computer devices, as well as a third computer device adapted to be used by the resolution facilitating entity over the computer network.

At least partially based upon the comments posted on the electronic media, the originating entity and/or the resolution facilitating entity are capable of developing a proposed corrective action to the issue, which can then be posted on the electronic media. A regulatory entity, which typically does not have access to the electronic media, can then review the proposed corrective action to thereby facilitate resolving the issue. Following lapse of at least a predetermined amount of time after developing the proposed corrective action, the issue is then closed.

Another advantageous aspect of the present invention comprises a system for implementing the associated process for communication of issues and resolution of the issues as described herein. Such a system may be implemented in computer software, or a combination of computer software and hardware, having one or more processing portions for accomplishing an associated process according to other embodiments of the present invention. In a representative embodiment, an electronic bulletin board or other discussion-capable electronic media is initiated and developed on a central computer or computer device that is part of a larger computer network such as, for example, the Internet. Such a central computer or computer device may comprise, for example, a desktop personal computer, a laptop personal computer, a server, a router, a mainframe computer or like devices or combinations thereof capable of implementing the described functions as known to one skilled in the art. Once established on the central computer or computer device, the bulletin board (also referred to herein as a "discussion board") is accessible to customers through customer computers, to an originating entity through an originating entity computer, and to a resolution facilitating entity through a facilitating entity computer, with each of the computers being an integral part of the computer network and communicable with the central computer or computer device through, for example, network communication lines.

The discussion board may be used by the customer, and/or the originating entity to report problems or other issues requiring resolution, with regard to the complex system(s) produced by the originating entity, so as to obtain a remedy or resolution therefor. In order to list or discuss technical issues regarding the complex system, the customer and/or the originating entity accesses the discussion board, via the respective computers, over the network communication lines that are in communication with the central computer or computer device. With this system, the customer and/or the originating entity are able to report and discuss problems with the complex system, wherein the reported problems and corresponding discussion can be monitored by a resolution facilitating entity via a resolution facilitating computer in communication with the central computer or computer device through the network communication line.

Upon developing a corrective action proposal based at least partially upon the posts on the discussion board, a regulatory entity, which typically does not have access to the discussion board, reviews the proposed corrective action to thereby facilitate resolution of the issue. Also, after developing the corrective action proposal, the originating entity can post the resolution proposal on the discussion board via the network communication lines. Upon lapse of at least a predetermined amount of time, the issue is directed to be closed and removed from the discussion board, such as by the originating entity.

These elements, alone or in combination, are capable of implementing the associated process of communicating issues and facilitating resolution of the issues according to embodiments of the present invention. The discussion board is generally implemented in computer software, though the system may also, in some instances, be implemented by a combination of software and hardware, for example, where the system encompasses remote computers, displays, or the like. Further, the issues and comments posted on the discussion board may be stored in, for instance, a memory device incorporated within or otherwise associated with the central computer or computer device. In addition, the central computer may, for example, at least partially include or be disposed in communication with a router, server, switch, or the like for communicating with the customer's computer, the originating entity's computer, and the resolution facilitating entity's computer. Alternatively, the central computer and any one or more of the other computers may be embodied by the same computer. These elements thus form a system for implementing the associated process according to embodiments of the present invention.

Thus, embodiments of the present invention provide a system capable of identifying industry and/or manufacturer reported problems comprising the prevalent concerns of the customers and for which a regulatory entity would be more likely to issue regulatory action. In contrast to conventional methods of assessing, or reviewing, an issue or concern, because the discussion board is accessible to the originating entity and resolution facilitating entity, as well as the customers, the discussion of the issues can be monitored to ensure that the discussion is taking place and that adequate opportunity for comment is provided. Also, because the discussion board provides a central location of discussion regarding the issues, the present invention provides an efficient and timely process of communication among customers of the complex system at issue. In this regard, the discussion can include customers that may not directly be affected by the issue but, nevertheless, have valuable information to provide.

BRIEF DESCRIPTION OF THE DRAWINGS

Some of the advantages of the present invention having been stated, others will appear as the description proceeds, when considered in conjunction with the accompanying drawings, which are not necessarily drawn to scale, in which:

FIGS. 3-11 are schematic representations of an Internet-implemented example of a system for issue notification and facilitation of issue resolution according to one embodiment of the present invention

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
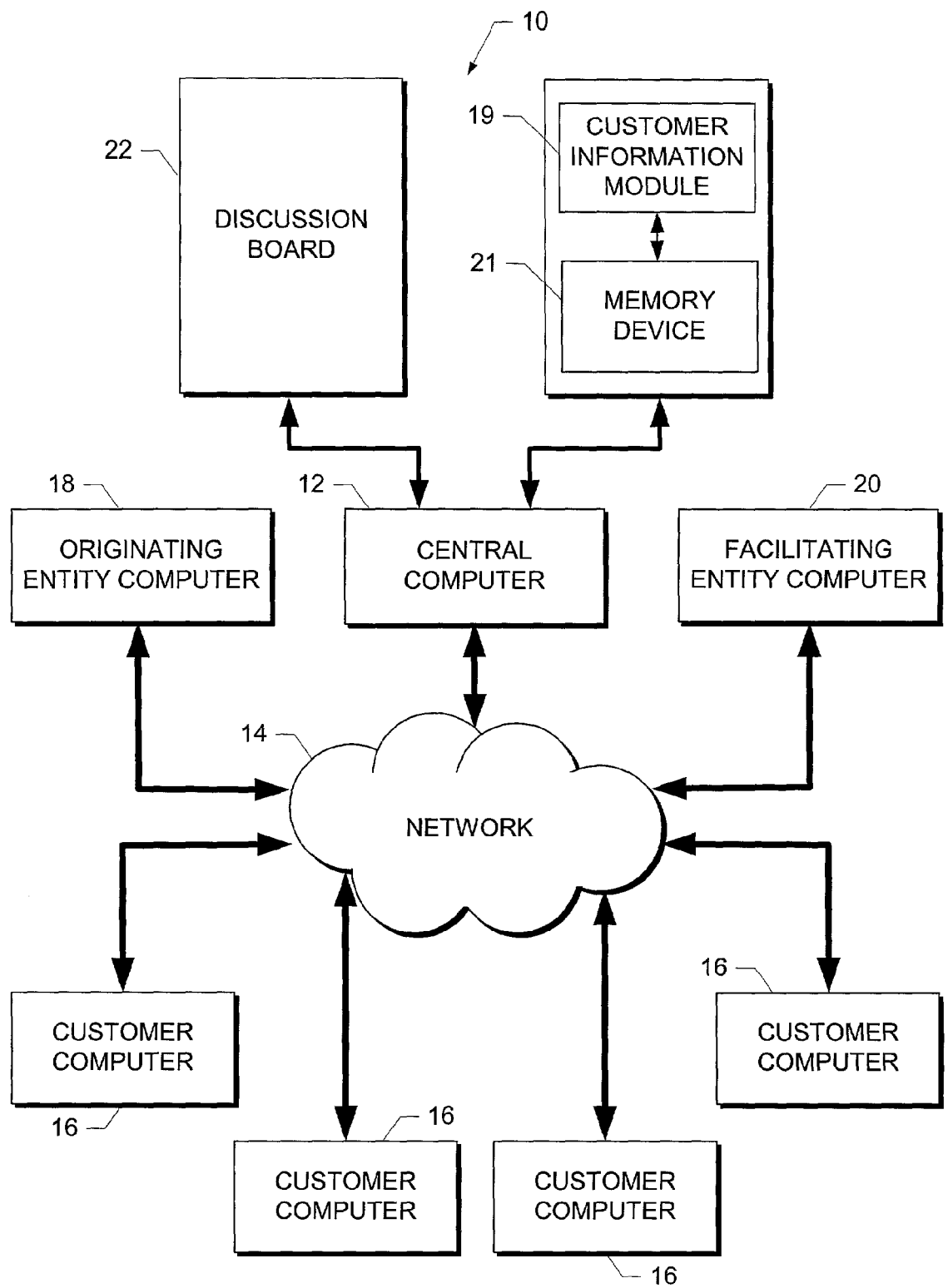
FIG. 1 is a block diagram of a system for issue notification and facilitation of issue resolution according to one embodiment of the present invention.

FIG. 1 is a block diagram of a system for communicating an issue and facilitating resolution of the issue according to one embodiment of the present invention and is representative of a system capable of implementing a process of communicating issues and facilitating resolution of the issues in accordance with further embodiments of the present invention. The system 10 is initiated and developed on a central computer or other computer device 12 wherein the central computer or other computer device is in communication with a larger computer network 14 such as, for example, the Internet. Such a central computer or a computer device, referred to herein as "central computer 12" for convenience and brevity, may comprise, for example, a desktop personal computer, a laptop personal computer, a server, a router, a mainframe computer, or like devices or combinations thereof capable of implementing the functions and processes described herein as known to one skilled in the art.

Once established on the central computer 12, the system 10 is accessible to at least one customer through customer computers 16 and to an originating entity through an originating entity computer 18, each of the computers being an integral part of the computer network 14 and communicable with the central computer through, for example, network communication lines. Additionally, the system can be accessible to a resolution facilitating entity through a resolution facilitating entity computer 20, which is also part of the computer network and communicable with the central computer through, for example, the network communication lines. In some instances, for example, elements of the system may include or be disposed in communication with a router, a server, a switch or the like, for appropriately administering the communications between the customer, the originating entity, and the resolution facilitating entity as detailed herein. Note that, while a simple schematic of several computers communicable over a computer network is presented herein, it is understood that this concept is representative of communication through an Internet site on, for example, the World Wide Web, and may involve many different computers and associated equipment, wherein the concept of communication via the Internet is known to one skilled in the art. Also note that, in some embodiments, the customer, originating entity and/or the resolution facilitating entity may utilize the system 10 in whole or in part, by telephone communication through, for example, an attended or automated call center in accordance with the spirit and scope of the present invention, wherein such a configuration is also known to one skilled in the art.

In order to establish the system 10 such as, for example, by establishing one or more issues to be examined so as to publicize the issues affecting the complex systems produced by the originating entity, a customer accesses the central computer 12 via a respective customer computer 16 over the network communication lines. Generally associated with the system on the central computer 12, and accessible by customer computers, the originating entity computer 18 and the resolution facilitating entity 20, are a customer information module 19, a memory device 21 and a discussion board 22. The customer registers with the customer information module via the network communication lines such that the nature of the customer's holdings of complex systems produced by the originating entity are known, particularly to the originating entity. The outcome of the process administered by the system 10 requires reporting and/or discussion of problems or other issues with respect to the complex system produced by the originating entity and subsequently can result in the issuance of a regulatory action in response to the reported issue from a regulatory entity to the originating entity and/or the customers.

Note that the customer computers 16, the originating entity computer 18, and the resolution facilitating computer 20 may each generally comprise any computer device or terminal configured to be communicable with the central computer 12 over the computer network 14, wherein a single computer device or terminal may, in some instances, comprise one or more of the computer elements. For example, a single computer device or terminal may comprise both a customer computer and the originating entity computer, or a single computer device may comprise both a customer computer and the resolution facilitating computer. In other instances, a single computer device or terminal may comprise both the originating entity computer and the resolution facilitating computer where the originating entity is responsible for communications on behalf of the resolution facilitating entity.

The system 10, including the customer information module 19 and the discussion board 22 are generally implemented in computer software, though the system may also, in some cases, be implemented in a combination of software and hardware. The information gathered through the customer information module is generally stored in, for example, one or more databases in the memory device 21 incorporated within or otherwise associated with the central computer 12. In addition, the discussion board 22 may comprise, for instance, a display or other mechanism for presenting text, graphics, audio, or the like to inform the customer, originating entity and/or the resolution facilitating entity of any relevant information pertaining to a reported problem or issue, a corresponding resolution proposal, and/or other information associated with the resolution of an issue through the system. For example, the discussion board may comprise an electronic bulletin board and/or other discussion-capable electronic media or the like such as, for instance, an "instant message" type system or a "chat board," that is initiated and developed on a central computer or computer device that is part of a larger computer network. Generally, these elements comprise a system, implemented in computer software or a combination of software and hardware, having one or more processing portions capable of executing embodiments of a process for identifying and facilitating resolution of issues according to the present invention. Thus, embodiments of such process according to the present invention may be implemented by one or more corresponding processing portions of an associated system, wherein each processing portion may comprise a software component, or both a software and hardware component, capable of implementing one or more of the specified functions. Accordingly, the operation of the system and its associated elements may be more particularly illustrated from the description of an associated process corresponding to one embodiment of the present invention.

Figure 2A:
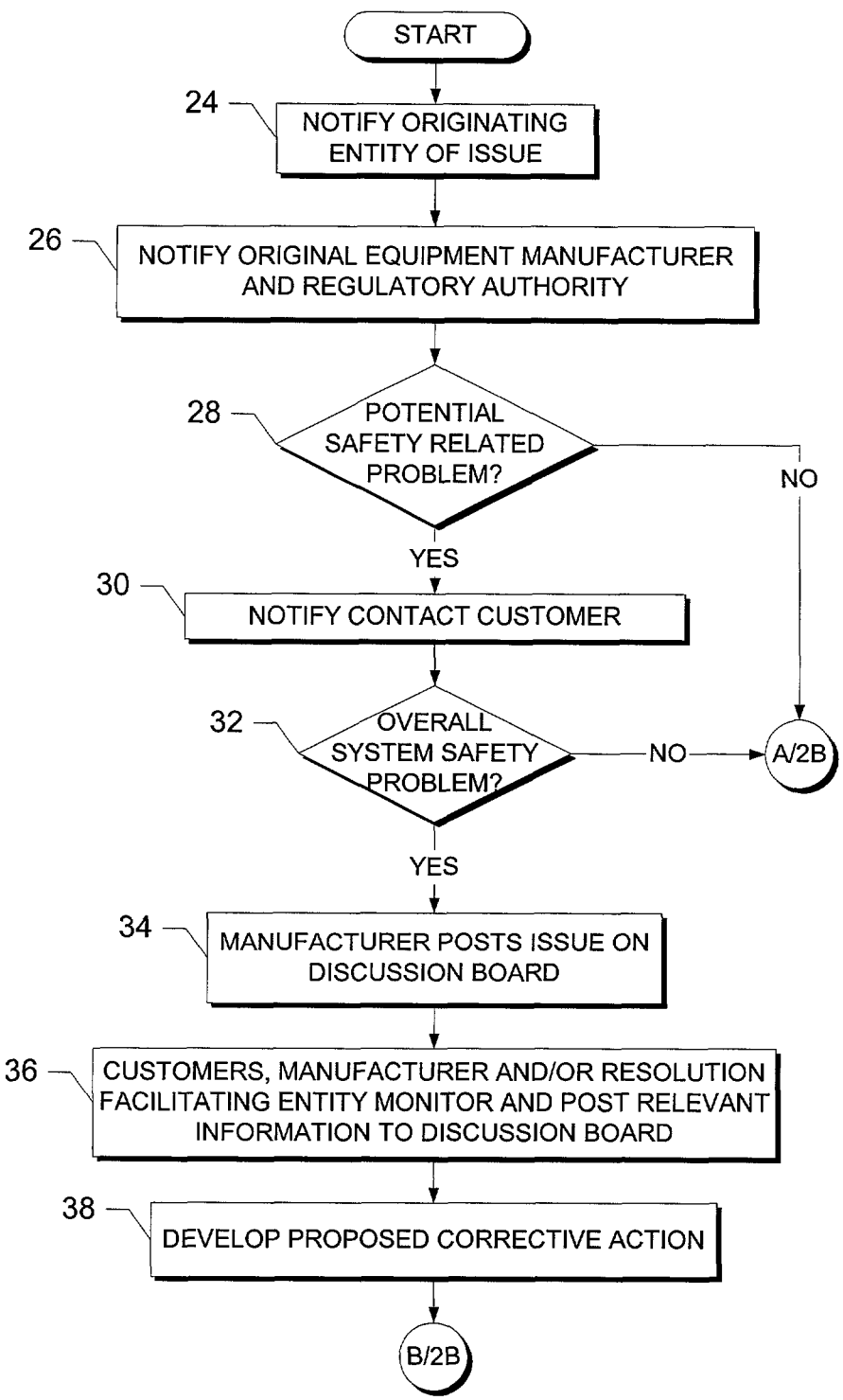
FIGS. 2A and 2B are flow diagrams illustrating various steps in a process of notifying at least one customer of an issue and facilitating issue resolution according to one embodiment of the present invention.
Figure 2B:
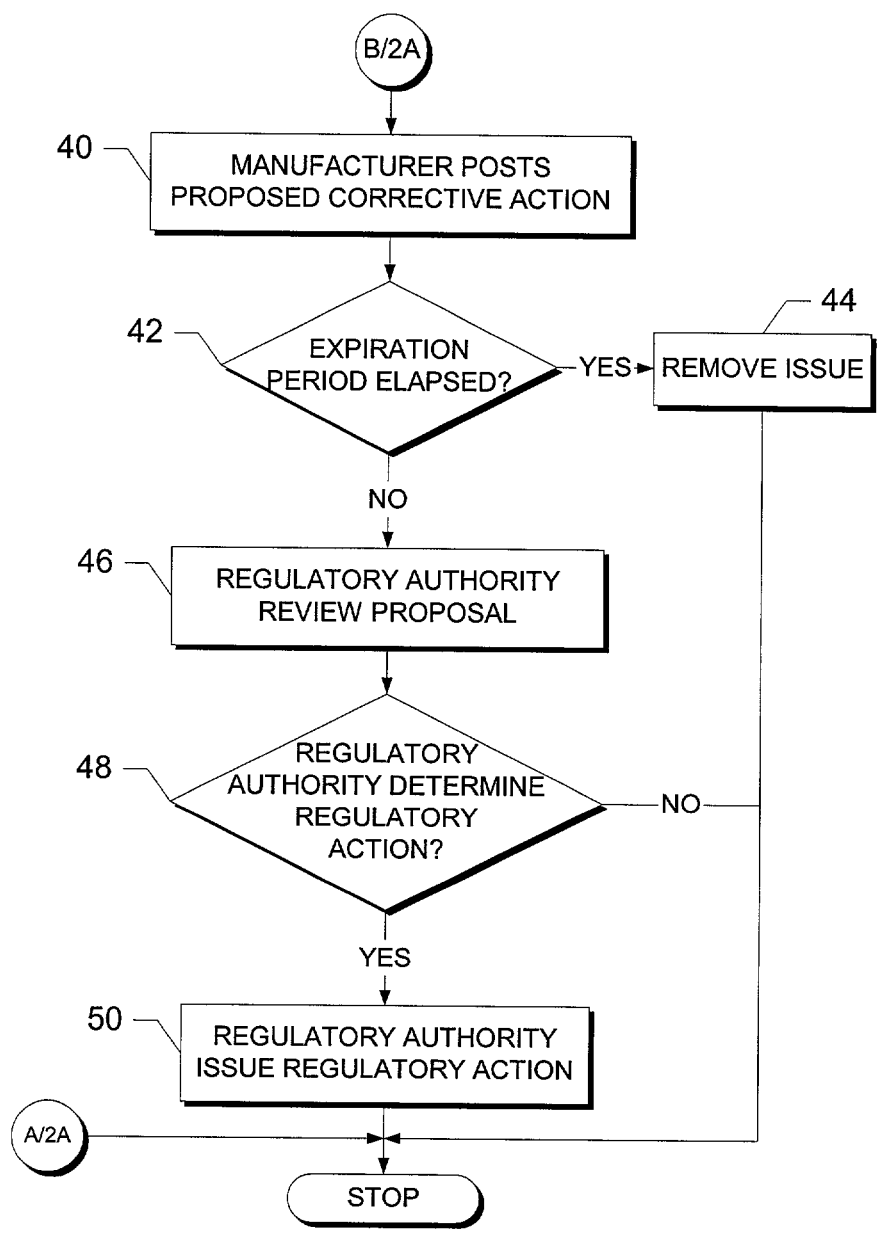

FIGS. 2A and 2B are flow charts illustrating steps in a process of communicating issues and facilitating resolution of the issues according to one embodiment of the present invention. As detailed herein, the described process may allude to a representative example involving the airline industry where the customer is an airline having a particular aircraft in its fleet and the originating entity is the manufacturer of that aircraft. In such an example, the resolution facilitating entity may comprise the Air Transport Association (ATA), which is the trade organization for the principal U.S. airlines. It would be understood that the present invention is not limited to aircraft, however, but may include and be applicable to a variety of industries such as, for example, military systems, railroads, power generation systems, or to organizations such as the military and business corporations, wherein a diversed customer base is able to benefit from customer consensus on issues of particular importance as well as from a forum for various customers to discuss and resolve issues. Note that the present invention may also be applicable within a particular organization where the "customer" may be a particular subgroup of the organization and the "manufacturer" comprises the administrator of the subgroups within the organization. Thus, the examples presented herein are not intended to limit the applicability of the embodiments of the present invention, but to illustrate possible applications consistent with the spirit and scope of the present invention.

As shown in FIG. 2A, a process of communicating an issue and facilitating resolution of the issue, according to one embodiment of the present invention, typically begins with a customer in possession of a complex system notifying the manufacturer producing the complex system of an issue regarding one or more components of the complex system (block 24). In this regard, system permits the manufacturer producing the complex system and at least one customer in possession of the complex system to raise issues and/or discuss the same on an electronic discussion board established as part of a system 10 on a central computer 12 within a computer network 14. In some embodiments, before the manufacturer and the customers raise issues and/or discuss the same, the customer registers with the customer information module 19 associated with the central computer 12 such that the nature of the customers' holdings of complex systems produced by the originating entity are known, such as to the originating entity. Note that any customer may, in actuality, comprise a plurality of customers, wherein, for example, a customer may represent an airline within a plurality of airlines utilizing a manufacturer's aircraft within its fleet.

The issues which may be posted and discussed on the discussion board 22 may be items determined to have a significant impact to the fleet of a particular airline or component (s) identified by the manufacturer as having a significant impact on the overall fleet of a particular model of aircraft as determined by the manufacturer's access to similar aircraft across many different airlines. In this regard, once the manufacturer has been notified of the issue, the manufacturer can assess whether the issue is safety related. The manufacturer can individually assess the issue or, as in a preferred embodiment, the manufacturer can notify the original equipment manufacturer (OEM) of the component(s) relevant to the issue (block 26). And once the OEM has been notified, the OEM can assess the issue to determine whether the issue is safety related (block 28). Additionally, because of the potential impact of a safety issue on the complex system involved, the originating entity can also notify the relevant regulatory entities, e.g., the Federal Aviation Administration (FAA), preferably before assessing whether the issue is safety related.

If the manufacturer and/or the OEM determine the issue is safety related, the potential safety-related issue is reviewed to determine whether the issue is an overall system safety issue. Also, the issue can be reviewed if the manufacturer and/or OEM determine that regulatory action is anticipated, if so desired. If the issue is not determined to be safety related and/or regulatory action is not anticipated, the issue is not reviewed to determine whether the issue is an overall system safety issue. But because the issue may still require resolution, any one of a number of different processes can be employed to resolve the issue. In this regard, one process for resolving such non-safety related issues is disclosed in U.S. patent application Ser. No. 09/656,678, entitled: System for Issue Notification, Prioritization, and Resolution and Associated Method filed on Sep. 7, 2000, the contents of which are incorporated herein by reference in their entirety.

To aid in reviewing the issue, a contact customer is designated and notified of the safety-related issue (block 30). In this regard, the contact customer can be designated in any of a number of different manners but, in one embodiment, the contact customer is designated as the customer having the most complex systems of the same series as the complex system affected. Once the contact customer has been notified, the manufacturer, OEM, contact customer and/or the resolution facilitating entity, e.g., ATA, review the issue to determine whether the safety-related issue affects the entire complex system, such as an airworthiness issue affecting an aircraft (block 32).

If the safety related issue is determined to be an issue that affects the entire complex system, the manufacturer posts the issue on the discussion board 22 (block 34). If the safety issue is not determined to be an issue that affects the entire complex system, however, the issue may or may not be posted on the discussion board, depending on the desired process of resolving the issue. According to one such process, disclosed by U.S. patent application Ser. No. 09/656,678, the issue is posted on the bulletin board to facilitate resolution of the issue. In posting the issue, the manufacturer typically posts the issue along with the specific information solicited from the customers and/or resolution facilitating entity, and a deadline for discussion. Once an issue is posted on the discussion board 22, all customers may review the posted issues to provide comments regarding the issues, such as the impact of each issue upon their fleet (block 36).

Additionally, or alternatively, after each issue is posted on the discussion board, the customers are notified of the issue, such as via e-mail, to thereby facilitate the customers viewing the issue posted on the discussion board and posting comments. Advantageously, all customers of the complex system can reply even though not possessing a system of the same series as the affected system. Further, should a customer and/or the manufacturer have previously encountered the reported issue, details of the resolution of the issue may be provided so as to be accessible to others. Additionally, to facilitate discussion among the manufacturer, contact customer, other customers and/or the resolution facilitating entity can monitor the discussion board to ensure discussion is taking place, as well as provide comments regarding the issue and/or discussion of the issue. In this regard, the manufacturer, contact customer, other customers and/or resolution facilitating entity can generally view all or a portion of the comments previously posted regarding each issue still posted on the discussion board. The system 10 may also be configured such that questions or other discussion may be exchanged between the customer and the manufacturer integrally with or independent of the discussion board 22.

After a specified amount of time has passed, the manufacturer, OEM, contact customer and/or the resolution facilitating entity develop a proposed corrective action to the issue according to established guidelines based at least partially upon the comments posted on the discussion board 22 (block 38). In this regard, the manufacturer, OEM, contact customer and/or the resolution facilitating entity can develop the proposed corrective action based upon initial inspections of the affected system on systems of the same series, the availability of replacement parts as well as facilities including adequate inspection tools and skills. Further, the manufacturer, OEM, contact customer and/or the resolution facilitating entity can consider the seriousness of the issue and complexity of the proposed corrective action when developing the proposed corrective action.

Once the proposed corrective action has been developed, the manufacturer can post the proposed corrective action to the discussion board, if so desired (block 40). In this regard, the customers can view the proposed action plan developed based at least partially upon the customers' comments. To ensure efficient use of the discussion board, the manufacturer then directs closure of the issue after the proposed corrective action plan has been posted for at least a predetermined amount of time (blocks 42, 44). It should be understood that, although the manufacturer directs closure of the issue, the issue as well as the comments and proposed corrective action can be generally stored in, for example, one or more databases in the memory device 21 incorporated within or otherwise associated with the central computer 12.

Also once the proposed corrective action has been developed, the proposed corrective action is forwarded to the regulatory entity (block 46). The regulatory entity receives the proposed corrective action and then determines whether to issue regulatory action regarding the issue to thereby facilitate resolution of the issue (blocks 48, 50). In this regard, the regulatory entity can determine whether to issue regulatory action based solely upon the proposed corrective action and the respective issue. But in one embodiment the regulatory entity determines whether to issue regulatory action further based upon additional information, such as additional communications with the manufacturer, OEM, contact customer and/or the resolution facilitating entity.

Figure 3:
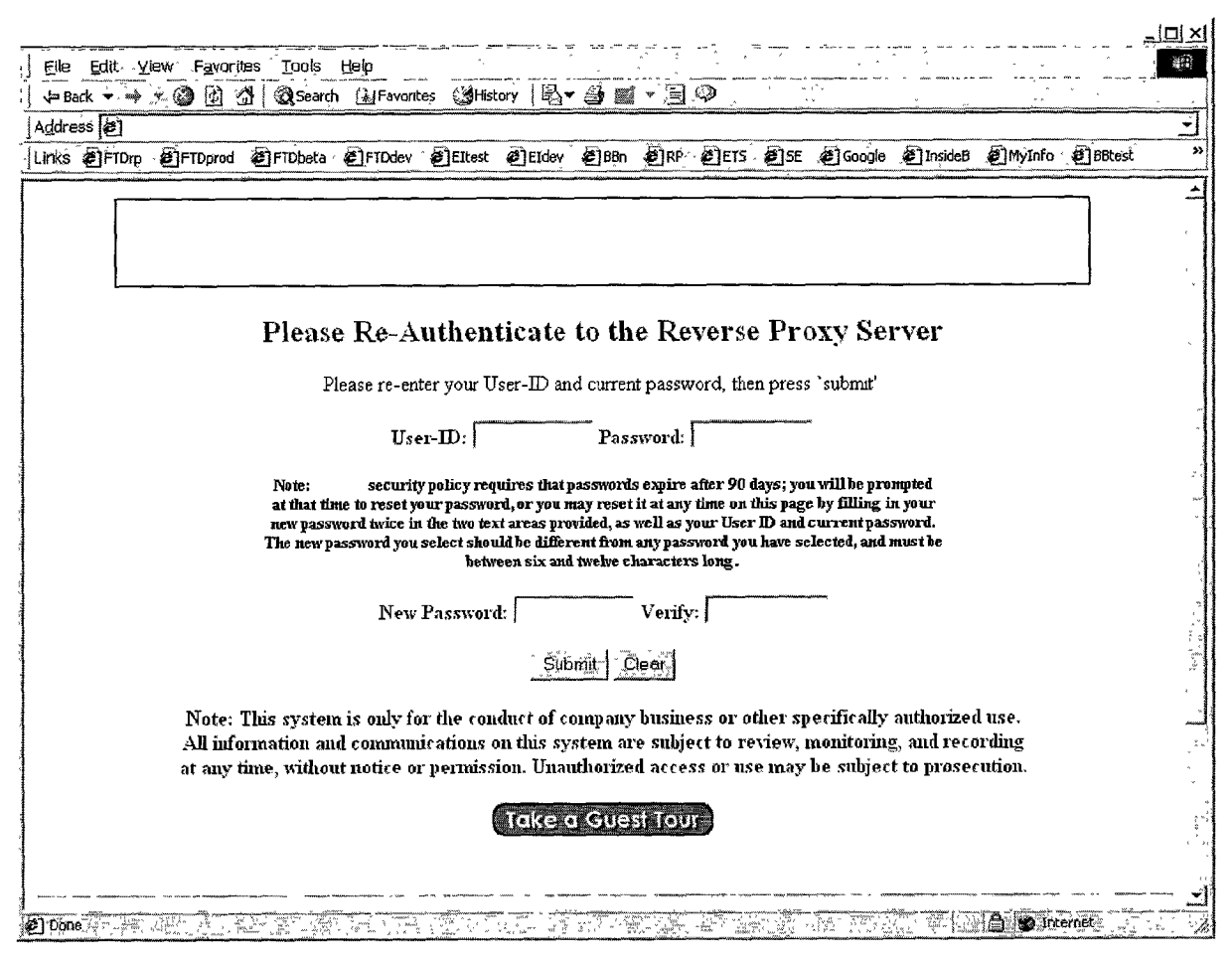
Figure 4:
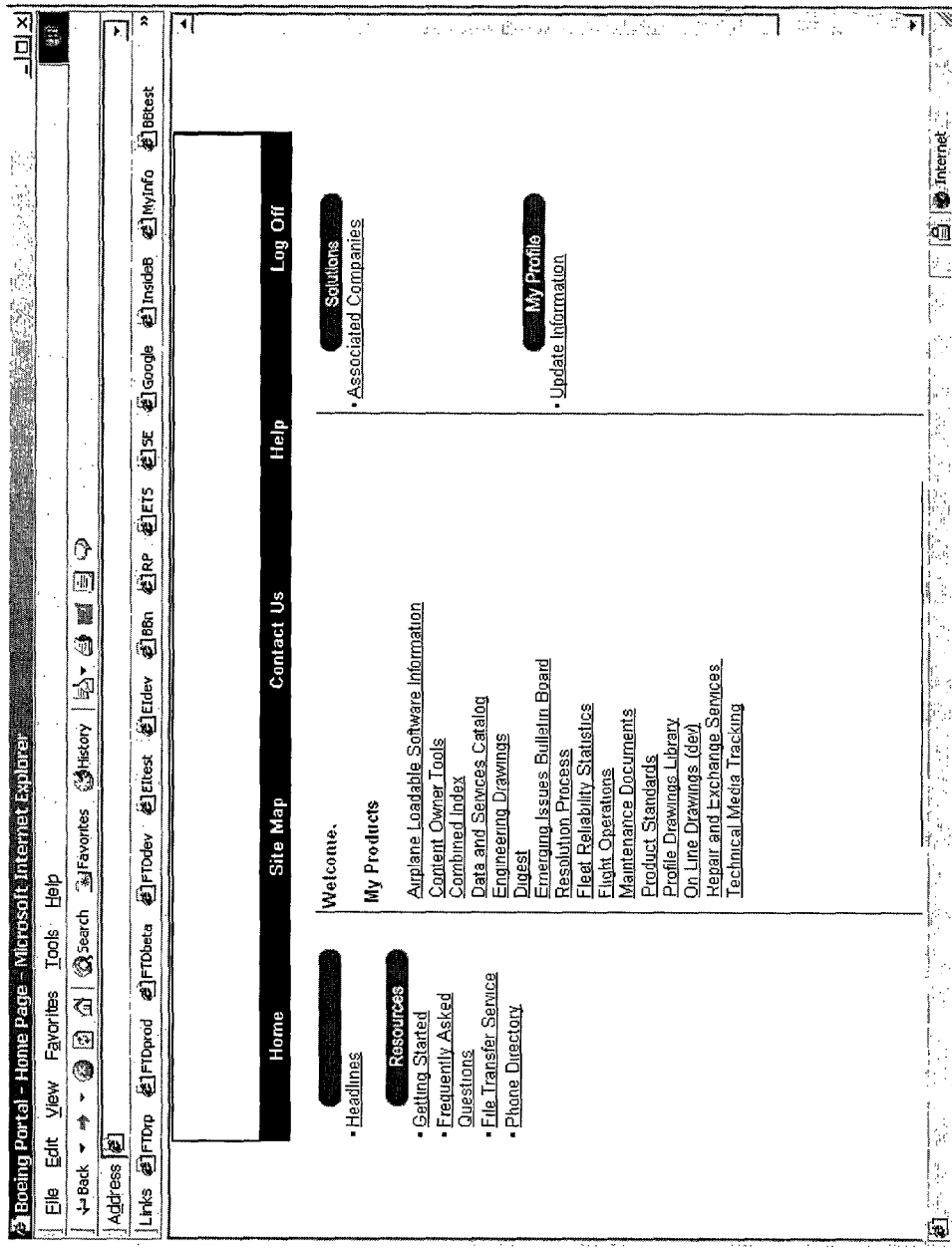
Figure 5:
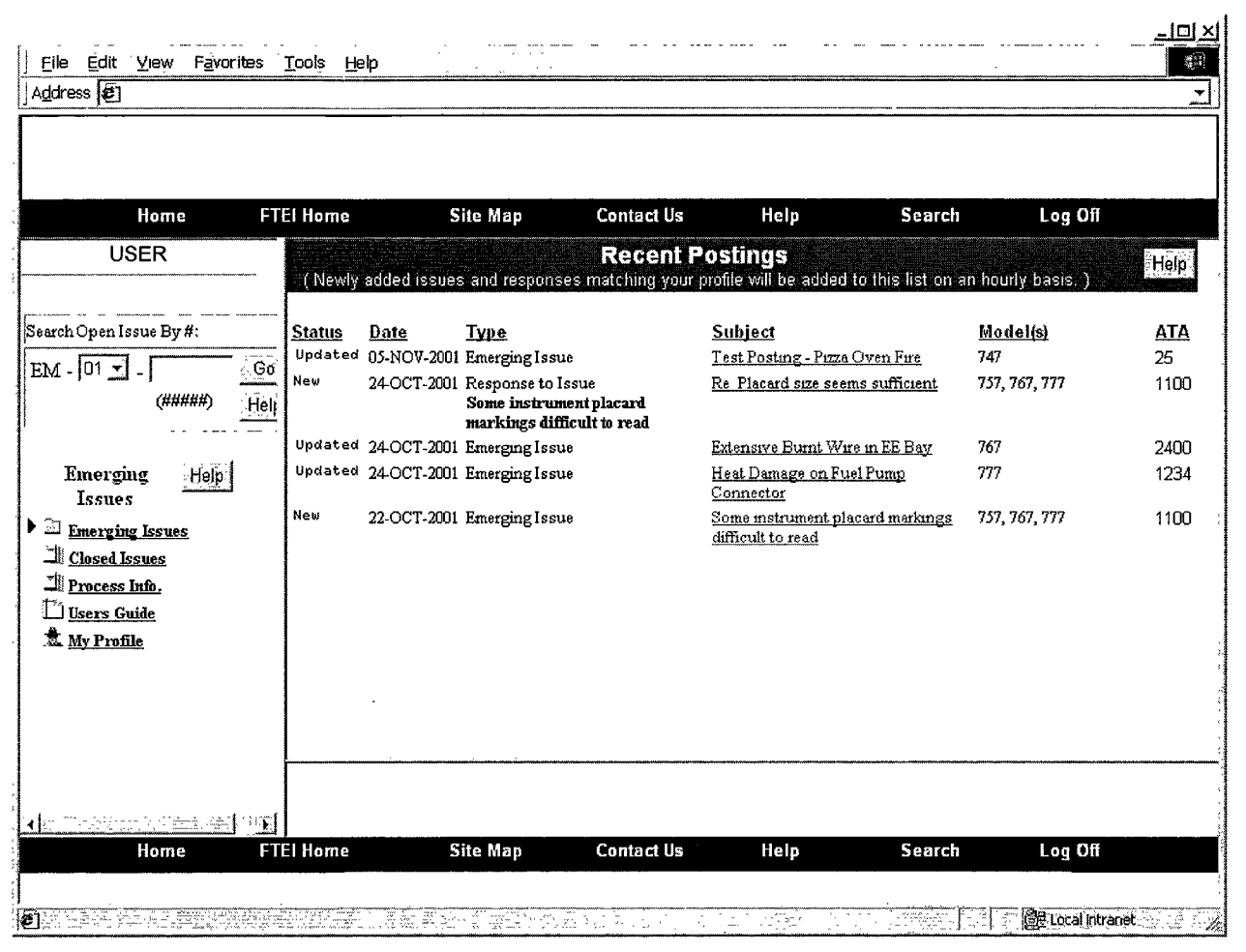
Figure 6:
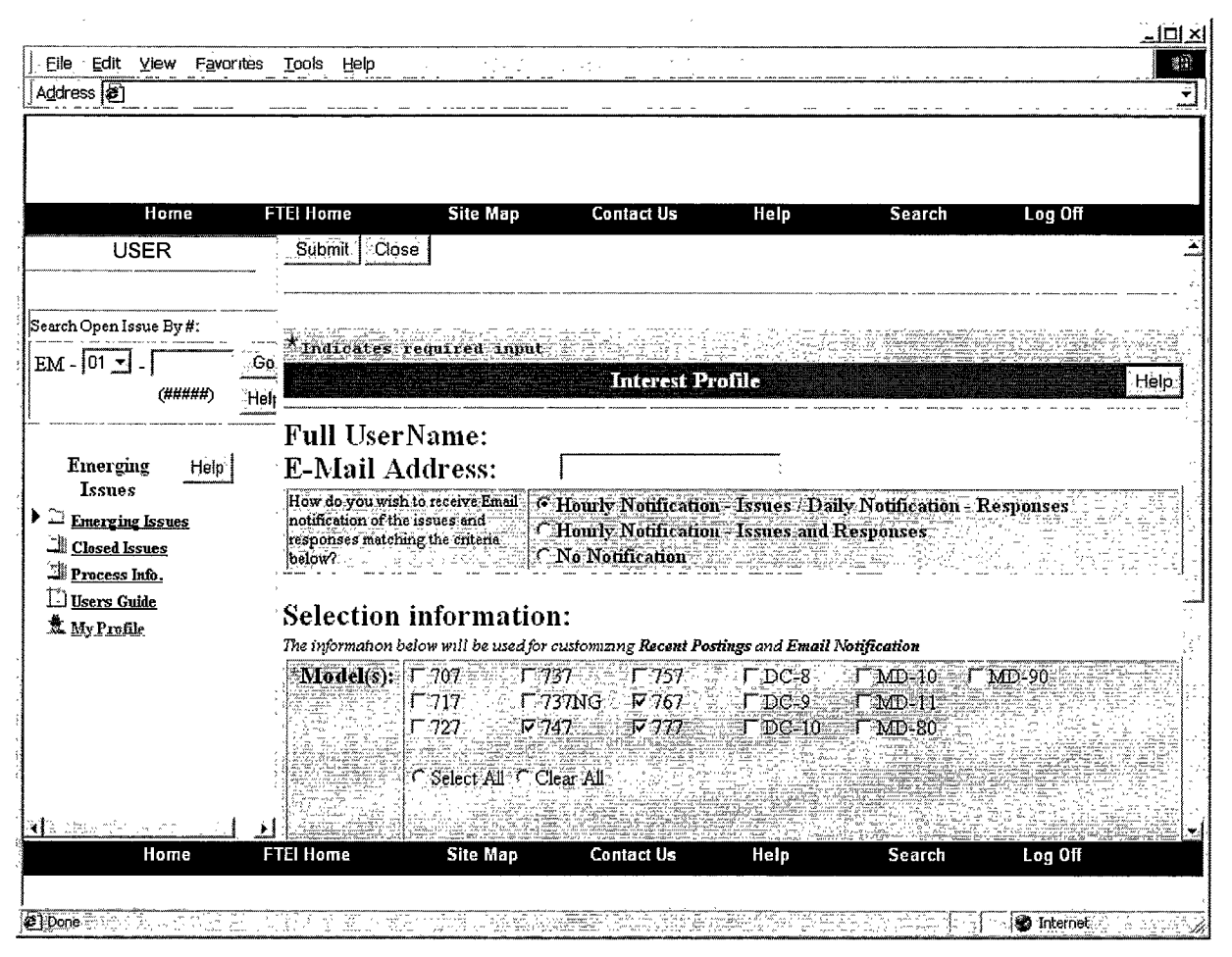
Figure 7:
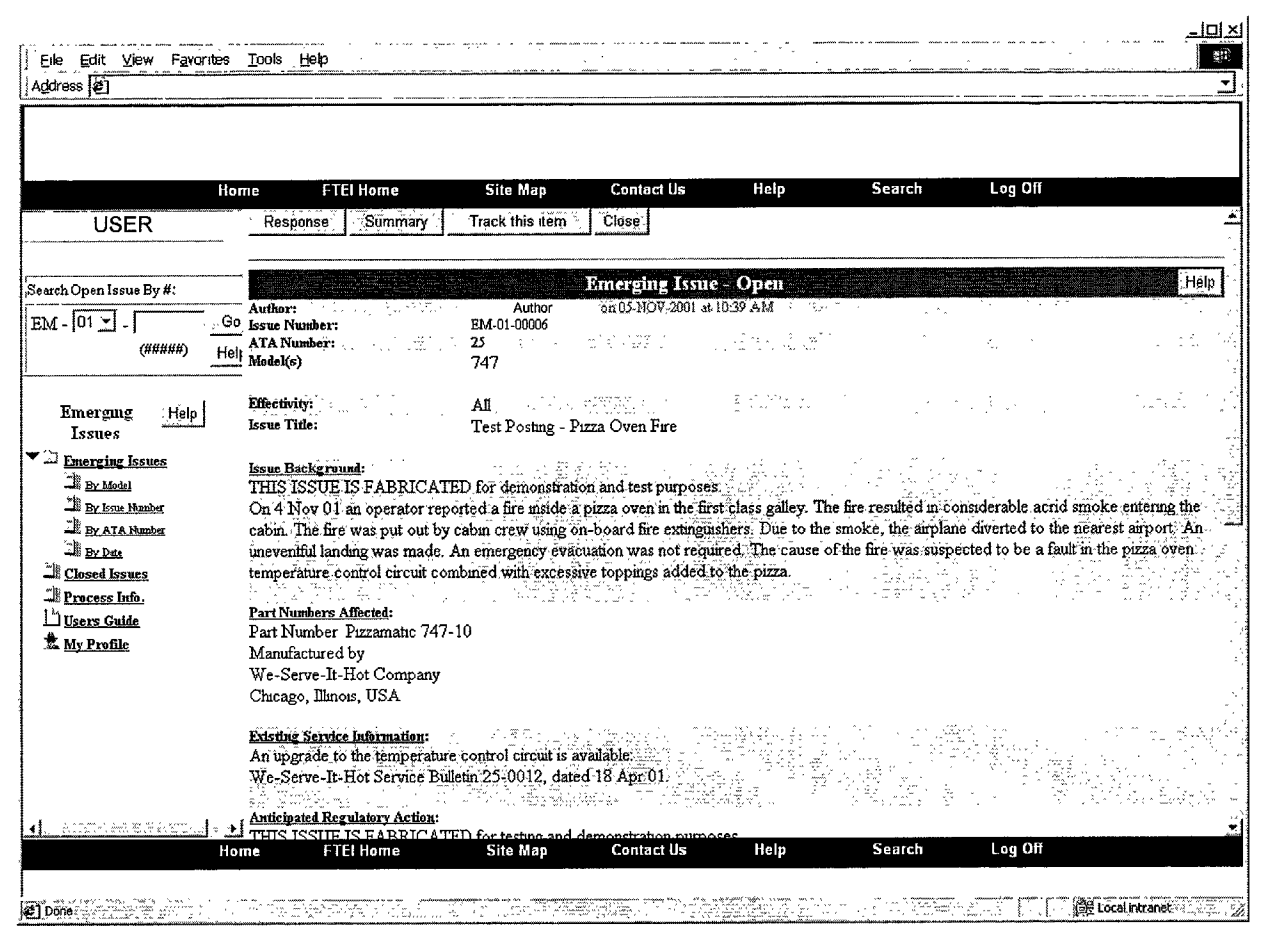
Figure 8:

FIGS. 3-11 illustrate an Internet-implemented example of a system for communicating issues and facilitating resolution of the issues according to one embodiment of the present invention. FIG. 3 illustrates an authentication portal whereby the manufacturer can limit access to the discussion board, such as to only the resolution facilitating entity and the customers. A manufacturer portal whereby a customer can access the discussion board (i.e., "Emerging Issues Bulletin Board"), as well as other information available from the manufacturer, is shown in FIG. 4. FIG. 5 illustrates the discussion board where the customers can review the subjects of the most recent issues posted on the discussion board, and from where the customer can access a customer profile wherein the customer can select to receive only those posts relating to specific systems, or aircraft, as shown in FIG. 6. As shown in the split screen views illustrated in FIGS. 7 and 8, from the subjects listed on the discussion board the customers can access details regarding specific issues, including "Issue Background," "Part Numbers Affected," "Existing Service Information," "Anticipated Regulatory Action," "Corrective Action Plan," "Input Requested," and "Requested Due Date."

Figure 9:
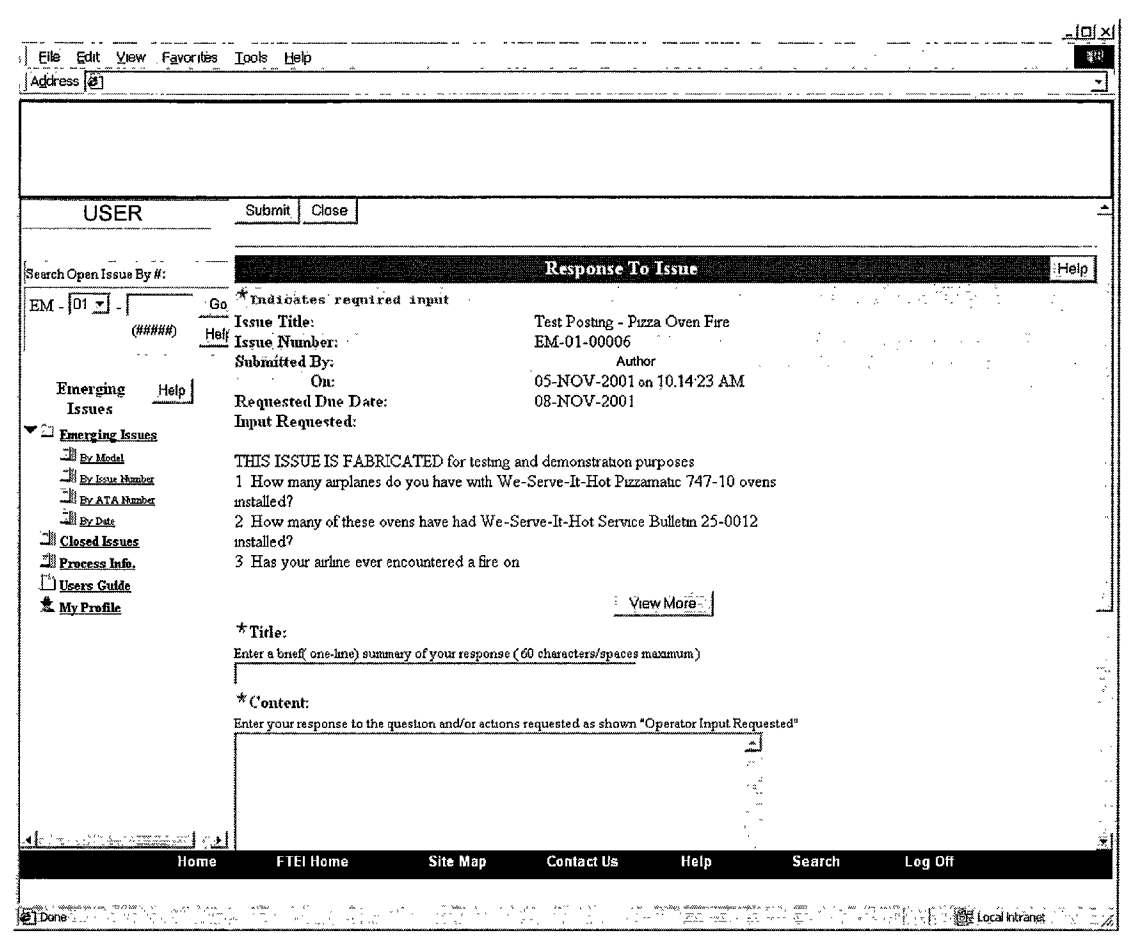
Figure 10:
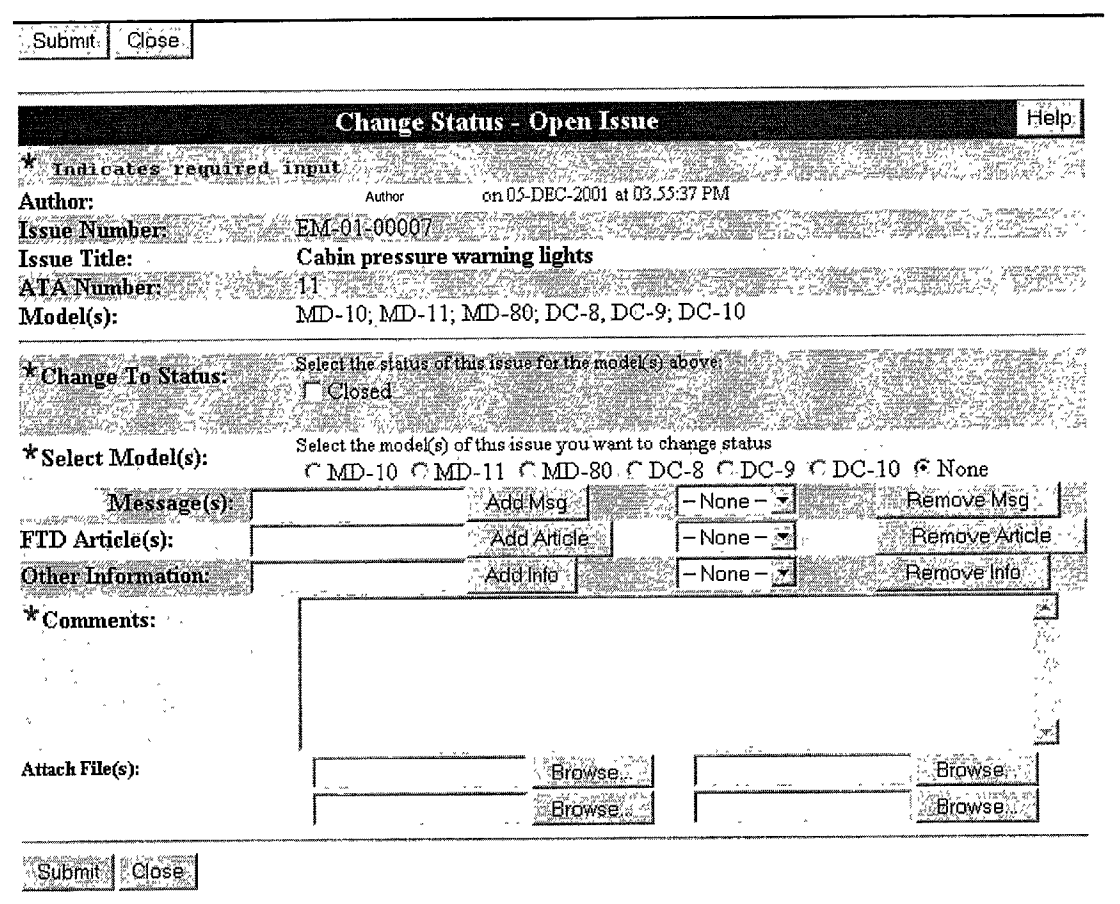
Figure 11:
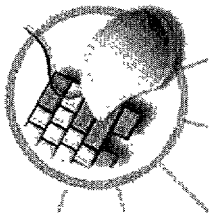

In response to the posting of the issue, the originating entity may receive one or more responses from customers on the discussion board. For example, from the details regarding the specific issues, customers can choose to respond to respective issues by filling out a summary and content of the customers' specific response, as illustrated in FIG. 9. And after the proposed corrective action has been developed and posted on the discussion board for at least a predetermined amount of time, the manufacturer can close the issue, such as by changing the status of the issue, as shown in FIGS. 10 and 11. It will be understood, however, that the examples presented herein are for the purposes of illustration and that actual issues may vary considerably in, for example, extent of discussion, complexity of relative impact evaluation, and issue resolution parameters in accordance with the spirit and scope of the present invention.

Therefore, the present invention, provides a system, process and computer program for communicating issues and resolving the issues. In contrast to previous methods, the present invention provides a discussion board that is accessible to an originating entity and resolution facilitating entity, as well as the customers. By providing a discussion board as a central location for discussing the issues, the discussion can be monitored to ensure that the discussion is taking place and that adequate opportunity for comment is provided. In so doing, the discussion board can significantly reduce financial/resource impacts on the industry. Additionally, the discussion board can provide the information needed to quickly determine that either a proposed regulatory action is not required, or that regulatory action is incumbent upon the industry to incorporate. Also, because the discussion board provides a central location of discussion regarding the issues, the present invention provides an efficient and timely process of communication among customers of the complex system at issue.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A process of communicating issues and facilitating resolution of the issues administered by an originating entity, wherein the issues affect a plurality of similar complex systems which comprise aircraft, the process comprising:

receiving an issue comprising a safety issue and at least one comment corresponding to the issue, wherein at least one of the issue or at least one comment is received from an originating entity comprising an aircraft a manufacturer of at least one system in the plurality of systems;

posting the issue and the at least one comment on a discussion-capable electronic media accessible to the originating entity and a plurality of customers in possession of a system in the plurality of systems over a network, the electronic media being configured to have a plurality of issues and a plurality of comments posted thereon;

developing a proposed corrective action to the issue at least partially based upon the comments posted on the discussion-capable electronic media;

allowing a regulatory entity to review the proposed corrective action to thereby facilitate resolving the issue; and closing the issue following lapse of at least a predetermined amount of time after developing the proposed corrective action to the issue.

2. The process according to claim 1, wherein the process is implemented over a computer network, wherein posting comprises posting the issue and the at least one comment on the discussion-capable electronic media accessible to at least one first computer device or a second computer device over the computer network, wherein each first computer device is adapted to be used by a customer in possession of a system in the plurality of systems, and wherein the second computer device is adapted to be used by the originating entity.

3. The process according to claim 2, wherein receiving comprises receiving an issue and at least one comment over the computer network from at least one of at least one first computer device or the second computer device.

4. The process according to claim 2, wherein posting comprises posting the issue and the at least one comment on the discussion-capable electronic media accessible to at least one first computer device, the second computer device and a third computer device over the computer network, the third computer device being adapted to be used by a resolution facilitating entity.

5. The process according to claim 1 further comprising posting the proposed corrective action to the discussion-capable electronic media after developing the proposed corrective action.

6. A system for communicating issues and facilitating resolution of the issues comprise safety issues and affect a plurality of similar complex systems which comprise aircraft, the system being implemented over a computer network and comprising:
- at least one first computer device adapted to be used by at least one customer and configured to be in communication with the computer network;
- a second computer device adapted to be used by an originating entity and configured to be in communication with the computer network, wherein the originating entity comprises a manufacturer of at least one system in the plurality of systems; and
- a third computer device configured to be in communication with said first and second computer devices over the computer network, said third computer device configured to maintain a discussion-capable electronic media accessible to said first and second computer devices over the computer network, the electronic media being configured to have a plurality of issues and a plurality of comments posted thereon, wherein said third computer device comprises:
  - a first processing portion configured to post an issue and at least one comment corresponding to issue on the discussion-capable electronic media, at least one of the issue or at least one comment having been received from the originating entity via said second computer device, wherein said second computer device has access to the discussion-capable electronic media to thereby aid the originating entity in developing a proposed corrective action to the issue at least partially based upon comments posted on the discussion-capable electronic media such that a regulatory entity can review the proposed corrective action to thereby facilitate resolving the issue; and
  - a second processing portion configured to facilitate closing the issue following lapse of at least a predetermined amount of time after the originating entity develops the proposed corrective action to the issue.

7. The system according to claim 6, wherein said third computer device further comprises a third processing portion configured receive the issue and the at least one comment corresponding to the issue from at least one of at least one first computer device or said second computer device over the computer network, wherein said third processing portion is configured to receive the issue and the at least one comment corresponding to the issue before said first processing portion posts at least one of the issue or the comment.

8. The system according to claim 6, wherein said third computer device further comprises a fourth processing portion configured to post the proposed corrective action on the discussion-capable electronic media after said first processing portion posts the issue and the at least one comment.

9. The system according to claim 6 further comprising a fourth computer device adapted to be used by a resolution facilitating entity and configured to be in communication with a computer network, wherein said third computer device is further configured to be in communication with said fourth computer device over the computer network, wherein the discussion-capable electronic media is further accessible to said fourth computer device over the computer network, and wherein at least one of said second computer device or said fourth computer device has access to the discussion-capable electronic media to thereby aid at least one of the originating entity or the resolution facilitating entity in developing the proposed corrective action to the issue.

10. The system according to claim 9, wherein said third computer device is embodied in at least one of the first computer device, the second computer device or the fourth computer device.

11. The system according to claim 6, wherein the originating entity comprises a manufacturer of the plurality of similar complex systems.

12. A non-transitory computer program product for communicating issues and facilitating resolution of the issues administered by an originating entity, wherein the issues affect a plurality of similar complex systems which comprise aircraft, the computer program product comprising a computer-readable storage medium having computer-readable program code embodied in said medium, the computer-readable program code comprising:
- a first executable portion for receiving an issue comprising a safety issue and at least one comment corresponding to the issue, wherein at least one of the issue or at least one comment is received from an originating entity comprising an aircraft manufacturer of at least one system in the plurality of systems;
- a second executable portion for posting the issue and the at least one comment on a discussion-capable electronic media accessible to the originating entity and a plurality of customers in possession of a system in the plurality of systems over a network, the electronic media being configured to have a plurality of issues and a plurality of comments posted thereon, wherein originating entity has access to the discussion-capable electronic media to aid the originating entity in developing a proposed corrective action to the issue at least partially based upon comments posted on the discussion-capable electronic media such that a regulatory entity can review the proposed corrective action to thereby facilitate resolving the issue; and
- a third executable portion for closing the issue following lapse of at least a predetermined amount of time after the originating entity develops the proposed corrective action to the issue.

13. The non-transitory computer program product according to claim 12, wherein the computer program product is implemented over a computer network, wherein said second executable portion posts the issue and the at least one comment on the discussion-capable electronic media accessible to at least one first computer device and a second computer device over the computer network, wherein each computer device is adapted to be used by a customer in possession of a system in the plurality of systems, and wherein the second computer device is adapted to be used by the originating entity.

14. The non-transitory computer program product according to claim 13, wherein said first executable portion receives an issue and at least one comment over the computer network from at least one of at least one first computer device or the second computer device.

15. The non-transitory computer program product according to claim 13, wherein said second executable portion posts the issue and the at least one comment on the discussion-capable electronic media accessible to at least one first computer device, the second computer device and a third computer device over the computer network, the third computer device being adapted to be used by a resolution facilitating entity.

16. The non-transitory computer program product according to claim 12 further comprising a fourth executable portion for posting the proposed corrective action to the discussion-capable electronic media after the originating entity develops the proposed corrective action to the issue.

\* \* \* \* \*